Sept. 13, 1955  F. A. SHERMAN  2,717,991
FLUID LEVEL INDICATOR
Filed June 2, 1952  2 Sheets-Sheet 1

INVENTOR.
FLOYD A. SHERMAN
BY
Soler and Ornstein
ATTORNEYS

Sept. 13, 1955 — F. A. SHERMAN — 2,717,991
FLUID LEVEL INDICATOR
Filed June 2, 1952 — 2 Sheets-Sheet 2
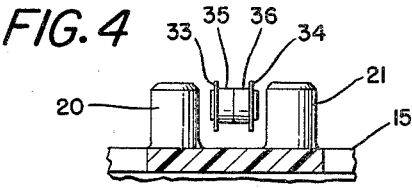
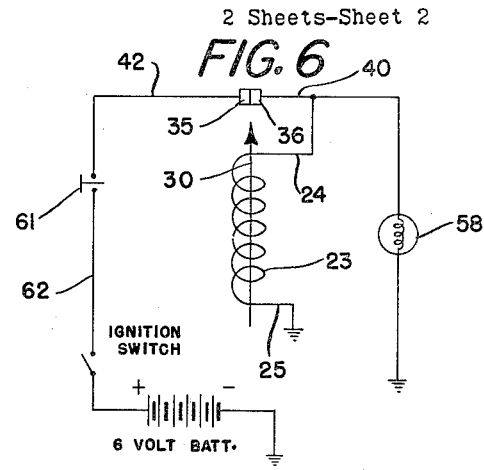
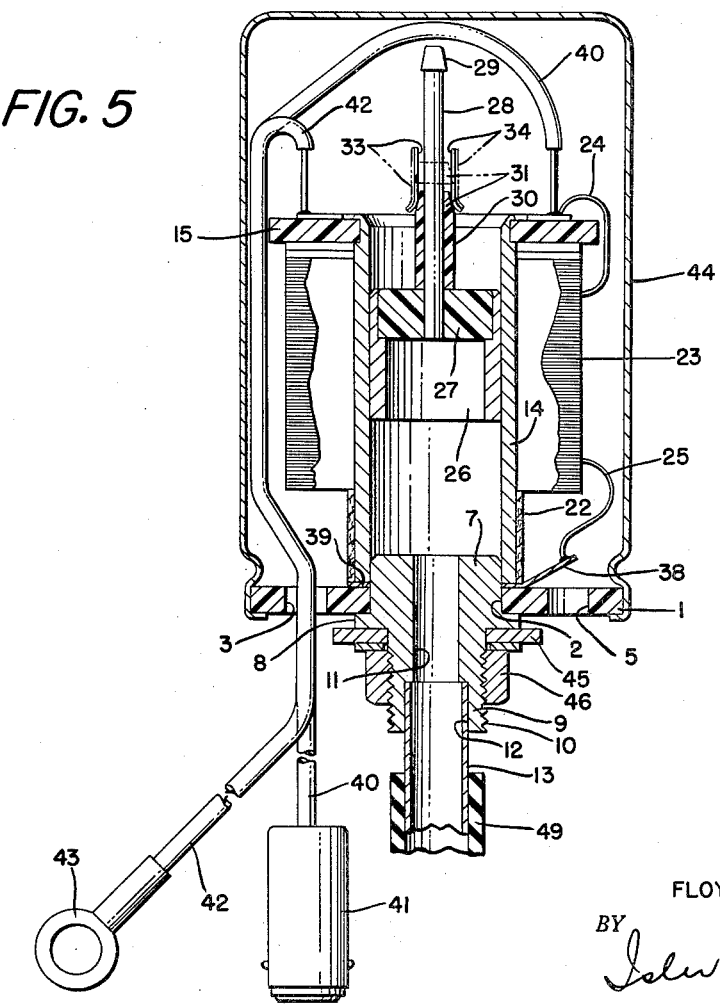
INVENTOR.
FLOYD A. SHERMAN
BY
ATTORNEYS United States Patent Office 2,717,991
Patented Sept. 13, 1955

2,717,991

FLUID LEVEL INDICATOR

Floyd A. Sherman, Birmingham, Mich.

Application June 2, 1952, Serial No. 291,249

10 Claims. (Cl. 340—244)

This invention relates in general to fluid level indicators, but has reference more particularly to a device of this character which is especially useful for checking the oil level in the crankcase of an automobile, and for similar operations.

A primary object of the invention is to provide a device of the character described which is especially adapted for use in connection with internal combustion engines and other types of engines requiring oil, water, or other liquids or chemicals for their operation.

Another object of the invention is to provide a device of the character described, which is adapted for mounting on the instrument panel of an automotive vehicle, enabling the driver or gas station attendant to check the oil level in the crankcase, the oil level in the automatic transmission, the water level in the radiator, or the water level in the battery, without lifting the hood, stopping the engine, or leaving the driver's seat.

Another object of the invention is to provide a device of the character described, which is operable by the driver of the automotive vehicle by means of an easily accessible switch to visually indicate the fluid level or condition.

A further object of the invention is to provide a device of the character described, in which the resistance afforded by the visual indicating means is effective to suppress the arc which would otherwise be formed in connection with the operation of the device, thereby eliminating the need for a condenser for this purpose.

A further object of the invention is to provide a device of the character described, which can be quickly and easily installed, with a minimum of labor, and even by unskilled persons.

A still further object of the invention is to provide a device of the character described, which is extremely compact, and consists of a minimum number of parts which can be manufactured and assembled at low cost.

Other objects and advantages of my invention will be apparent during the course of the following description. In the accompanying drawings forming a part of this specification and in which like numerals are employed to designate like parts throughout the same, Fig. 1 is a fragmentary perspective view, showing the manner in which the fluid level indicator is mounted on an automobile;

Fig. 4 is a fragmentary cross-sectional view, taken on the line 4—4 of Fig. 3;

Fig. 5 is a view similar to Fig. 2, but showing a different position of certain of the parts, and Fig. 6 is a wiring diagram, showing the circuit and manner of use of the device.

Figure 1:
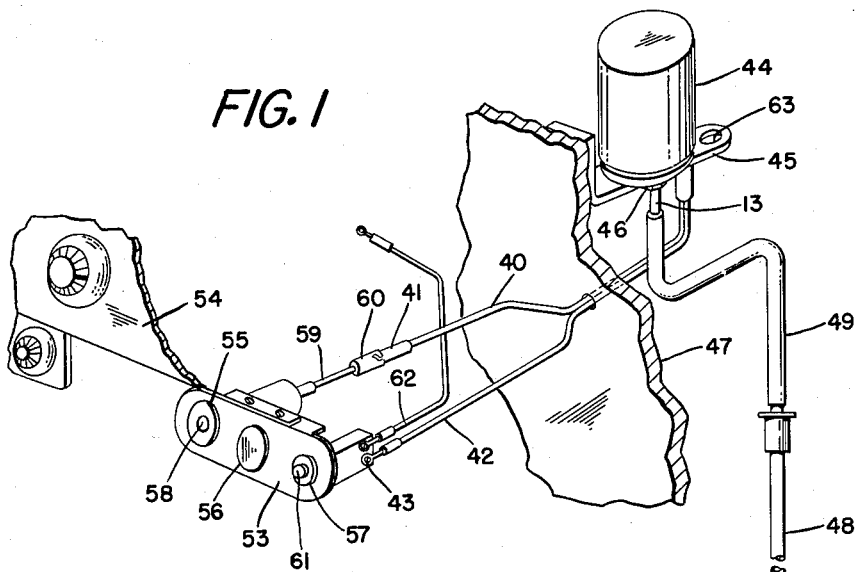
Figure 2:
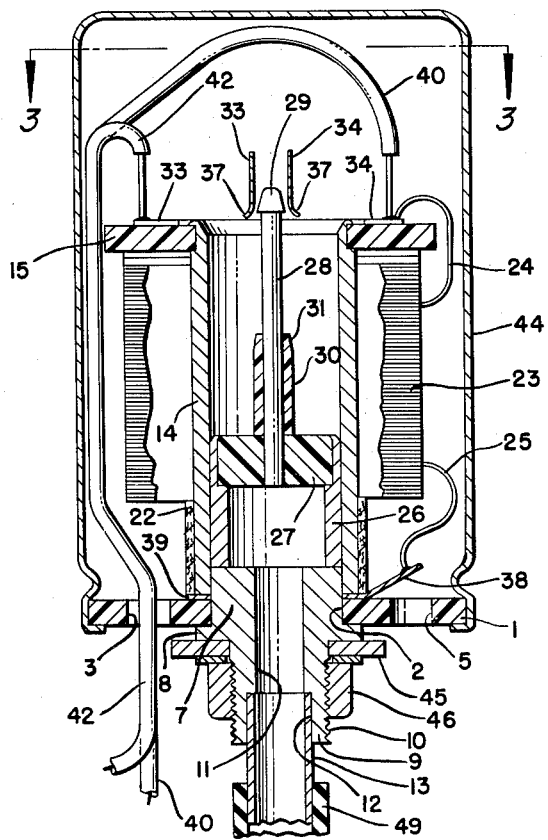
Fig. 2 is a vertical cross-sectional view through the indicator, taken on the line 2—2 of Fig. 3.
Figure 3:
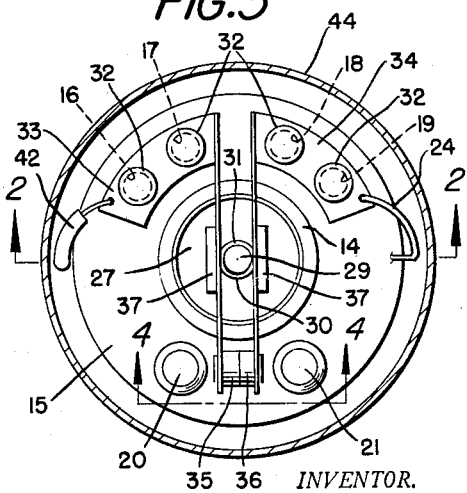
Fig. 3 is a transverse cross-sectional view, taken on the line 3—3 of Fig. 2.

Referring more particularly to the drawings, the device will be seen to comprise a disc-like support 1, formed of an electrically insulative fiber, and provided with a central opening 2 and four circumferentially-spaced small openings of which only two, 3 and 5, are shown.

Secured within the opening 2 is a metallic mounting plug 7 provided with a flange 8 which is in abutment with the lower surface of the disc 1, and an extension 9 of reduced external diameter, which is threaded as at 10, for a purpose to be presently described. The plug 7 is provided with an axial bore 11, which is counterbored, as at 12, for the reception of one end of a short tube 13, preferably made of copper, which is soldered to the plug.

Disposed above the support 1, and about the plug 7 is a cylinder 14, preferably formed of brass, and to the upper end of which is crimped or riveted a disc-like support 15, made of a plastic, such, for example, as Plaskon. The support 15 is provided with four circumferentially-spaced holes 16, 17, 18 and 19, and with a pair of spaced upstanding pins 20 and 21.

Disposed above the support 1, and about the lower portion of the cylinder 14, is a cylinder 22, made of paper, which provides a support for a solenoid coil 23, which is interposed between the cylinder 22 and the lower surface of the support 15 and surrounds the upper portion of the cylinder 14. The coil 23 preferably consists of 450 turns of #26 E. C. wire, with paper insulation between the layers of wire. The leads from this coil are designated by reference numerals 24 and 25.

Mounted for vertical sliding movement in the cylinder 14 is a piston unit consisting of a piston 26, preferably formed of seamless tubing, nickel-plated, and a plug 27, of a plastic material, such as Plaskon, crimped or riveted to the upper end of the piston 26.

Secured rigidly in the plug 27, centrally thereof, is a brass pin 28, having a mushroom-shaped head 29 at the upper end thereof. Slidably mounted on the pin 28 is a short cylindrical element 30 having a tapered upper end 31, the function of which will be presently described.

Secured to the upper face of the support 15, as by means of rivets 32 extending through the openings 16, 17, 18 and 19, is a pair of contact carriers 33 and 34. The carrier 33 has mounted in the forward end thereof a contact 35 and the carrier 34 has mounted in the forward end thereof a contact 36. Each carrier is provided intermediate its ends with a downwardly and outwardly extending flange 37, formed integrally with the carrier.

These carriers are preferably formed of brass shim stock, .005" in thickness, and are resiliently biased in such a manner that the contacts 35 and 36 are normally in engagement with each other.

The lead 24 from the solenoid coil 23 is soldered to the base of the contact carrier 34, and the lead 25 from the coil is soldered to the flange 38 of a ground anchor 39 which is interposed between the lower end of the cylinder 15 and the support 1.

A cable 40 leads from the base of the contact carrier 34 and passes through one of the openings in the support 1, being provided at its lower end with a plug connection 41. A cable 42 leads from the base of the contact carrier 33 and passes through the same opening in the support 1 through which the cable 40 passes, and is provided at its lower end with a terminal 43.

The device, as thus described, is adapted to be completely enclosed within a housing 44 of aluminum or the like, which is crimped to the support 1.

The device is adapted to be mounted on a bracket 45 as by means of a nut 46, which is threadedly secured to the threads 10 of the extension 9. The bracket, in turn, is adapted to be attached, as by a bolt or self-tapping screw, to the highest point possible on the engine side of the firewall 47 of the automobile.

A calibrated tubular dipstick 48 is provided, in order to enable the operator to manually check the oil level at any time. This dipstick 48 replaces the conventional dipstick, and is connected to the tube 13, as by means of a rubber hose 49.

The dipstick 48 is provided near its lower end with spaced lines or markings 50 and 51, and with an opening 52 adjacent the mark 51. The lines 50 and 51 correspond with conventional markings on a conventional dipstick.

A mounting panel 53 is also provided, which is secured to the bottom of the instrument panel 54 of the automobile. This panel is provided with spaced openings 55, 56 and 57. An electric bulb or light 58 is mounted in the opening 55 in the panel and is pressed into place. A lead 59 from the bulb 58 is provided with a connector socket 60 in which the plug 41 is removably secured.

A push button switch 61 is mounted in the opening 57 of the mounting panel, and one terminal of this switch is connected to the terminal 43 of the cable 42. The other terminal of this switch is connected, as by a short lead 62, to the hot side of the ignition switch of the automobile, i. e., to the hot side of the conventional 6-volt automobile battery.

The device, as described, enables the oil level of the engine to be checked, with the engine on or off, and with the car in motion or standing.

With the engine running, the operator presses the button of the switch 61, closing the switch. This causes current to pass through the coil 23 and through the contacts 35 and 36, creating a magnetic pull, which causes the piston unit 26—27 (which rests on the top of the plug 7 when the switch 61 is open) to be lifted. If the opening 52 of the dipstick is above the desired level of oil in the crankcase, thereby denoting that oil must be added to the crankcase, air will be sucked through the dipstick into the cylinder 14, causing the piston unit to fly upwardly quickly. This causes the pin 28 to rise upwardly through the space between the contact carriers 33 and 34 and causes the tapered end 31 of the element 30 to engage the flanges 37 camming the flanges apart, and breaking the contact between the contacts 35 and 26, as shown in broken lines in Fig. 5. The piston will then fall by gravity to the lower end of the cylinder. As the piston descends, the head 29 of the pin 28 engages the element 30 and pulls the latter down, thereby permitting the contacts 35 and 36 to again come in contact with each other.

The lifting cycle will then be repeated, and at the same time, the light will blink at each cycle, thereby indicating visually to the driver that air is being sucked into the dipstick, and that oil must be added to the crankcase.

Due to the lost motion connection between the plastic element 30 and the pin 28, the plastic element will remain frictionally held between the contact carriers for a short period until pulled downwardly by the head of the pin. This slight delay in the retraction of the plastic element delays the contacts 35 and 36 from reestablishing contact with each other, and in this way, insures a uniform and slower blinking action, as well as a more uniform and slower action for the unit as a whole, which is highly desirable.

The use of the plastic element 30 as a contact breaker is also of advantage in that it prevents any metallic parts from coming in contact with the contact carriers, which might cause a short circuit, should the installer of the device connect the wires in an improper manner.

If the opening 52 of the dipstick is below the desired level of oil in the crankcase, that is to say, submerged in the oil, a vacuum will be developed in the cylinder 14, with the result that the piston unit 26—27 will not fly upwardly and break contact between the contacts 35 and 36, but, instead, will rise slowly, the upper end of the element 30 coming to rest just below the flanges 37 of the contact carriers, remaining there until the switch is opened. The light will remain on, thereby indicating visually to the driver that the device is operating properly, that the oil level is correct, and that oil need not be added.

To recapitulate, if the engine is running, and the indicator light blinks, the crankcase oil is down 1 quart of oil; if the light remains constant, the oil level is O. K. When the oil is checked, when the engine is off, the indicator will blink only when the oil level is down to two quarts. This is due to the fact that the oil level, when the engine is running, is about a quart higher than when the engine is off.

The resistance of the light 58 across the solenoid coil 23 suppresses the arc, which would normally appear across the contacts 35 and 36, thereby eliminating the need for a condenser for this purpose.

The lines 50 and 51 on the dipstick enable the oil level to be checked manually, at any time, if desired.

The upstanding pins 20 and 21 serve as stops as well as guards to prevent the contact carriers from being spread apart too far, and from being injured during assembly.

The extra opening 63 in the bracket 45 is provided for installation of a unit similar to that described, for cars equipped with hydramatic drive, where it is desired to check the oil level of such drive. Where such an extra unit is used, the central opening 56 in the mounting panel 53 is used for mounting of a second switch for such extra unit.

Although the device has been described in connection with the determination of the oil level in a crankcase, it will be readily understood that it may also be used for determining fluid level generally, in tanks, vats and other containers used to hold fluids. It may, for example, be used in an automobile to determine the level of water in the radiator, or the level of water in the automobile battery, it being understood, of course, that a separate device is used for each of these purposes, and that the construction of the device and its various connections may be modified to counteract the effects of corrosion, etc.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

This application is a continuation-in-part of my copending application, Serial No. 244,245, filed August 29, 1951, now abandoned.

Having thus described my invention, I claim:

1. In a fluid level indicator, a cylinder, a solenoid coil, a piston slidably movable in said cylinder, an electrical circuit for energizing said coil to move said piston, means communicating with the interior of said cylinder and adapted to be submerged in the fluid, and visual indicating means responsive to the movement of said piston for indicating the condition of the fluid level.

2. An indicator, as defined in claim 1, in which said first-named means includes a hollow tube adapted to be partially submerged in the fluid.

3. An indicator, as defined in claim 1, in which said first-named means includes a tube communicating with the lower end of the cylinder, a flexible hose connected to the lower end of said tube, and a second tube connected to the opposite end of said hose.

4. An indicator, as defined in claim 1, in which said electrical circuit includes a source of current and a pair of contacts.

5. An indicator, as defined in claim 4, in which said visual indicating means includes a circuit in parallel with said first-named circuit, and an electric bulb in said parallel circuit.

6. In a fluid level indicator, a cylinder, a solenoid coil, a piston in said cylinder, an electrical circuit for energizing said coil to move said piston, means communicating with the interior of said cylinder and adapted to be submerged in the fluid, and visual indicating means responsive to the movement of said piston for indicating the condition of the fluid level, said visual indicating means including a circuit in parallel with said first-named circuit and a blinker light in said parallel circuit, said piston rising rapidly to break the parallel circuit when said first-named means is above the desired level of fluid and to fall again to reestablish the circuit, causing said light to blink, said piston rising slowly when said first-named means is below the desired level of fluid but not sufficiently to break the parallel circuit, whereby said blinker light remains constant to indicate that the oil level is satisfactory.

7. An indicator, as defined in claim 6, in which said first-named means includes a hollow tube adapted to be partially submerged in the fluid.

8. An indicator, as defined in claim 6, in which said first-named means includes a tube communicating with the lower end of the cylinder, a flexible hose connected to the lower end of said tube, and a second tube connected to the opposite end of said hose.

9. An indicator, as defined in claim 6, in which said electrical circuit includes a source of current and a pair of contacts.

10. An indicator, as defined in claim 9, in which a pin is carried by said piston, and an element of electrically insulative material is mounted on said pin and has a lost motion connection therewith, said element being movable by the piston to a position between the contacts to break the contact between the contacts.

References Cited in the file of this patent

UNITED STATES PATENTS

| | | |
|---|---|---|
| 888,340 | Macloskie | May 19, 1908 |
| 1,107,794 | Ireland | Aug. 18, 1914 |
| 1,427,548 | Raboni | Aug. 29, 1922 |
| 2,534,381 | Sebastian et al. | Dec. 19, 1950 |
| 2,588,761 | Roby | Mar. 11, 1952 |